(12) United States Patent
Rock et al.

(10) Patent No.: US 6,739,643 B1
(45) Date of Patent: May 25, 2004

(54) VEHICLE-MOUNTED COLLAPSIBLE CHAIR

(76) Inventors: Patrick T. Rock, 360 Evelyn Ave., Delafield, WI (US) 53018; Daniel L. Haluzak, 877 Laurcate Dr., Pewaukee, WI (US) 53072

( * ) Notice: Subject to any disclaimer, the term of this patent is extended or adjusted under 35 U.S.C. 154(b) by 0 days.

(21) Appl. No.: 10/304,327

(22) Filed: Nov. 26, 2002

Related U.S. Application Data

(60) Provisional application No. 60/336,011, filed on Dec. 5, 2001.

(51) Int. Cl.[7] .................................................. B60N 2/02
(52) U.S. Cl. .................... 296/64; 296/65.01; 296/65.03; 297/16.1
(58) Field of Search ................................ 296/64, 65.01, 296/65.03, 69, 65.16, 65.05, 63; 297/16.1, 43, 45, 232

(56) References Cited

U.S. PATENT DOCUMENTS

| | | | |
|---|---|---|---|
| 2,612,207 A | 9/1952 | Branson | |
| 5,451,088 A | 9/1995 | Broad | |
| 5,462,334 A | 10/1995 | Sedorcek et al. | |
| 5,752,636 A | 5/1998 | Manley | |
| 5,752,639 A | 5/1998 | Rice | |
| 5,833,308 A | 11/1998 | Strong, III et al. | |
| 5,857,741 A | * 1/1999 | Anderson | .................... 297/170 |
| 6,082,269 A | 7/2000 | Padberg | |
| 6,125,480 A | * 10/2000 | Soffar et al. | ................. 224/519 |
| 6,189,458 B1 | 2/2001 | Rivera | |
| 6,269,578 B1 | * 8/2001 | Callegari | ........................ 42/94 |
| 6,314,891 B1 | * 11/2001 | Larson | ......................... 108/44 |

* cited by examiner

*Primary Examiner*—D. Glenn Dayoan
*Assistant Examiner*—Greg Blankenship
(74) *Attorney, Agent, or Firm*—Boyle Fredrickson Newholm Stein & Gratz S.C.

(57) ABSTRACT

A collapsible seat assembly releasably attachable to a vehicle includes a support member for attachment to a vehicle hitch receiver, a pair of pivotable arms attached to the support member and a pair of support assemblies pivotally attached to the arms opposite the support member. The support assemblies include a pair of support surfaces that can be formed into a seating surface to enable individuals to sit on the assembly. The assembly can also be collapsed into a storage configuration that can easily be transported when attached to the vehicle.

27 Claims, 9 Drawing Sheets

VEHICLE-MOUNTED COLLAPSIBLE CHAIR

CROSS REFERENCE TO RELATED APPLICATION

This application claims priority under 35 U.S.C. §119(e) to U.S. Provisional Patent Application No. 60/336,011, filed Dec. 5, 2001.

FIELD OF THE INVENTION

The present invention relates to seat assemblies, and more specifically to a collapsible seat assembly that can be releasably mounted to a hitch receiver disposed on a vehicle.

BACKGROUND OF THE INVENTION

Many social activities, such as sporting events, camping trips, or other outdoor activities, require individuals to drive to the location where the activity is taking place. Therefore, the individuals driving to the activity must take with them all of the items which are required for the activity, including chairs or other types of seating assemblies that are to be used outside of the vehicle. The storage and transportation of these chairs and other seat assemblies is often problematic as these items take up a large amount of room within the vehicle, leaving less room in the vehicle for the individuals and other items which also need to be taken to the activity.

In order to provide more room within the interior of the vehicle for the individuals and the items other than chairs or seat assemblies to be taken to the activity, a number of alternative seat assemblies that can be attached to the exterior of the vehicle have been designed. For example, Anderson U.S. Pat. No. 5,857,741, which is herein incorporated by reference, discloses a tailgate table and chairs. The assembly is mounted directly to a trailer hitch secured to the vehicle and includes a table and a pair of chairs that are supported by the vehicle hitch. The assembly shown in the Anderson '741 patent also allows for the chairs of the assembly to be disassembled or removed from the exterior of the vehicle for transport. However, the configuration of this assembly does not allow for easy conversion of the assembly from a use position to a storage position due to the large sizes of the individual pieces of the assembly. Furthermore, these large pieces must still be secured on or within the vehicle in order to be transported.

Therefore, it is desirable to design a hitch-mounted seat assembly that is easily movable between a storage position and a use position. The design of the seat assembly should also allow the assembly to be moved without the need for disassembling any part of the seat assembly. Further, the seat assembly should have a small profile when in the storage position, and should be capable of being moved out of the way of the tailgate or trunk of the vehicle in order to allow easy access to items contained within the vehicle.

SUMMARY OF THE INVENTION

It is an object of the present invention to provide a hitch-mounted seat assembly that is easily collapsible from a use position to a storage position.

It is another object of the present invention to provide a collapsible seat assembly in which the various components of the assembly can be pivoted with respect to one another in order to move the assembly from the storage position to the use position.

It is still another object of the present invention to provide a seat assembly that may include various attachments releasably secured to the assembly to enhance the utility of the seat assembly.

It is still a further object of the invention to provide a seat assembly that has a simple and easy to utilize construction without any parts that need to be disassembled when moving the assembly from the storage position to the use position or vice versa.

The present invention is a collapsible seat assembly that can be releasably mounted to a hitch receiver on a vehicle. The seat assembly includes a support member that is releasably and movably securable to the hitch receiver and provides support for the remainder of the seat assembly. A pair of arms are pivotally attached to opposite sides of the support member and can pivot from a vertically oriented storage position to a horizontally oriented use position. Each arm includes a support assembly pivotally secured to the arm opposite the support member. The support assemblies each include a first member pivotally secured to the arm opposite the support member and a second member pivotally secured to the first member. The first and second members of the support assemblies can be pivoted with respect to each arm and with respect to one another from a vertically oriented storage position for each member to a horizontal use position for the first member and a vertical use position for the second member.

The support assemblies also include a pair of support surfaces connected between the first members and second members of each support assembly, respectively. When the seat assembly is in the use position, the two support surfaces are respectively oriented generally horizontally and vertically to provide both a seat and backrest for individuals utilizing the seat assembly. The support surfaces may be formed of a flexible material, which enables the support surfaces to be easily collapsed from their extended, use positions to collapsed, storage positions along with the support assemblies and arms of the seat assembly.

The seat assembly also includes a support member extension pivotally secured between the arms to the support member and utilized to provide additional support beneath the horizontal support surface when the seat assembly is in the use position. The seat assembly extension is also useful in enabling a number of separate attachments to be secured to the seat assembly in either the use position or the storage position to allow the seat assembly to perform a number of additional functions other than simply providing a seating surface for individuals.

Various other features, objects and advantages of the invention will be made apparent from the following detailed description taken together with the drawings.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
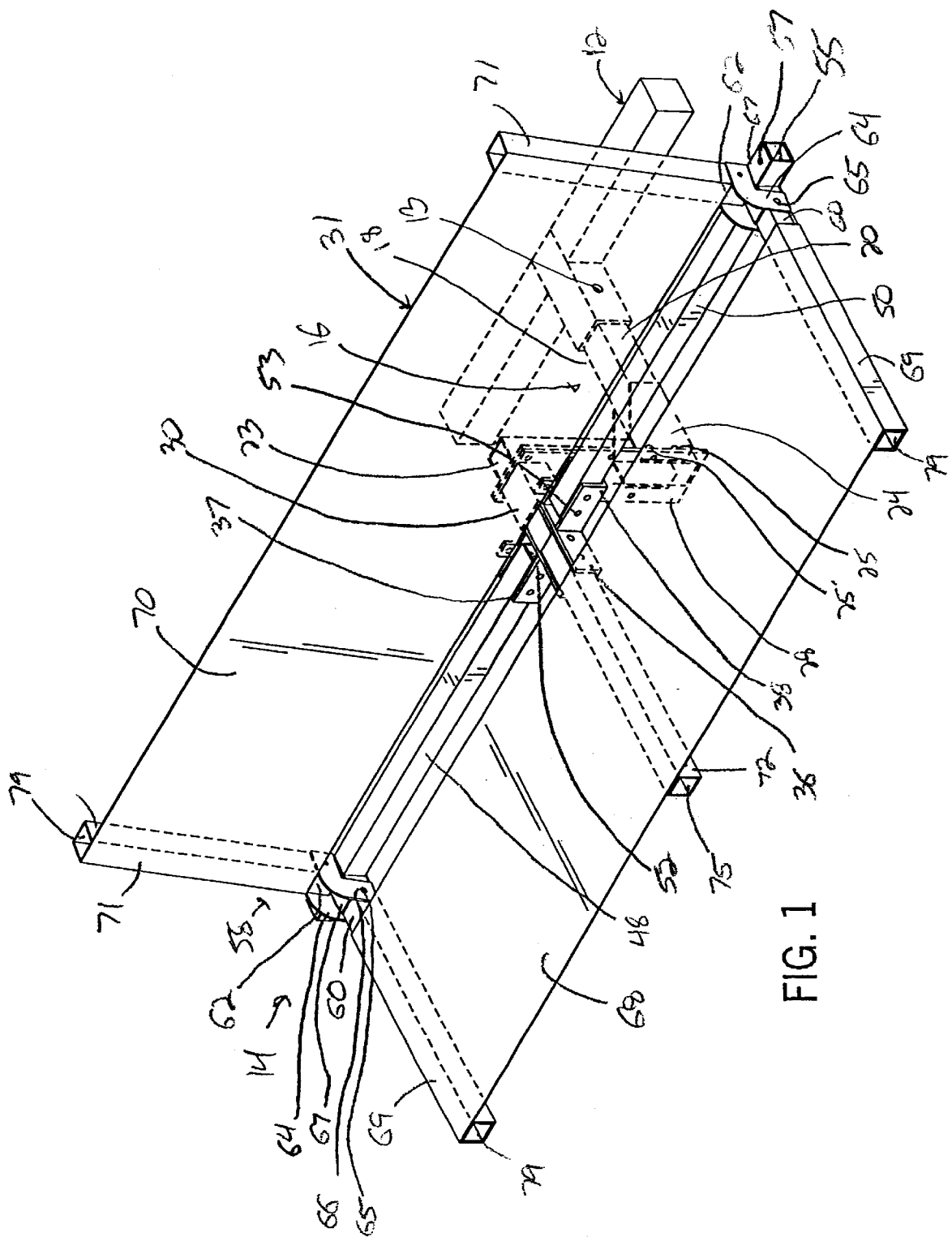
FIG. 1 is an isometric view of the seat assembly of the present invention in the extended, use position.

With reference now to the drawing figures in which like reference numerals designate like parts throughout the disclosure, a conventional hitch receiver 12 secured to a vehicle (not shown) and having openings 13 is shown in FIGS. 1–6. A seat assembly 14 is releasably connected to hitch receiver 12, and includes a support member 16 that is engageable with the hitch receiver 12. The support member 16 includes a hitch attachment portion 18 having a first end 20 including openings 21 alignable with the openings 13 in the hitch receiver 12 to receive a locking pin 22, and a second end 23 positioned generally perpendicular to the first end 20.

The second end 23 of support member 16 is connected to the first end 20 by a pair of brackets 24 fixed to the first end 20 opposite the receiver 12 that include two pairs of aligned openings 25 and 25' spaced from the first end 20. The second end 23 includes a pair of opposed openings 26 that are alignable with one of the pairs of openings 25 in order to receive a pin 27 therethrough, such that the second end 23 is pivotally secured to the first end 20. The second end 23 can also be locked in an upright position by inserting a second pin 27' through another pair of opposed openings 26' spaced from the openings 26 and alignable with the other pair of openings 25' located in the brackets 24. The second end 23 further includes a securing plate 28 fixed to the second end 23' opposite the brackets 24 and used as an attachment point for a frame support portion 30 of a seating frame 31 that extends perpendicularly to the second end 23.

Figure 9:
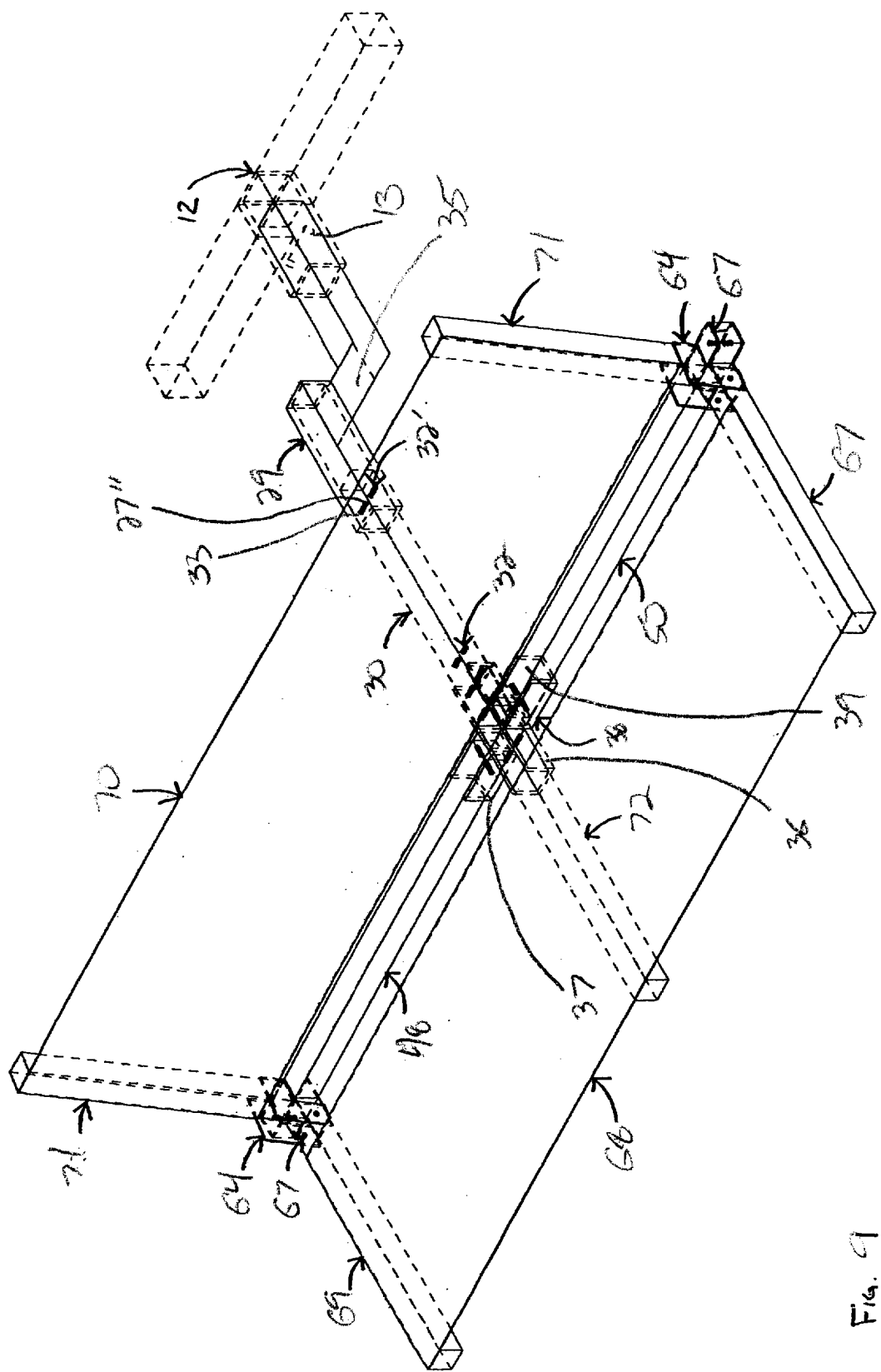
FIG. 9 is an isometric view of a second embodiment of the seat assembly of the present invention.

In an alternative embodiment of the support member 16, as shown in FIG. 9, the frame support portion 30 is slidably mounted within a securing sleeve 29 secured to the second end 23 opposite the first end 20 of the hitch attachment portion 18. The frame support portion 30 includes two pairs of spaced and aligned openings 32 and 32' disposed adjacent opposite ends of the frame support portion 30 which are alignable with a pair of openings 33 in the securing sleeve 29 to receive a pin 27'' therethrough to secure the frame support portion 30 in an extended or a retracted position. The second end 23 and first end 20 are also joined by an angled section 35 disposed between the first end 20 and second end 23 in order to raise the height of the second end 23 in order to properly position the seat assembly 14 with respect to the vehicle.

Referring back to FIGS. 1–6 opposite the securing plate 28, the frame support portion 30 includes a number of U-shaped brackets or channels 36, 37 and 38 secured to the portion 30. The channel 36 extends outwardly from the end of the frame support portion 30 opposite the securing plate 28 and parallel to the frame support portion 30, while the other channels 37 and 38 are disposed on opposite sides of the frame support portion 30 and extend outwardly from the frame support portion 30 perpendicularly to the channel 36 and frame support portion 30. Each of the channels 36, 37 and 38 is secured to the frame support portion 30 to define an open upper end 39, and each includes a pair of aligned openings 40, 41 and 42, respectively, that receive and retain a pin 44, 45 or 46 that extends between the openings 40, 41 and 42, respectively.

The channels 37 and 38 each receive one of a pair of arm members 48 and 50 that extend outwardly from the channels 37 and 38 perpendicular to the frame support portion 30. Each arm member 48 and 50 includes a pair of aligned openings 52 and 53 disposed on opposite sides of the arm members 48 and 50 and positionable within the channels 37 and 38 in alignment with the openings 41, 42 in order to receive the pins 45, 46 therethrough to pivotally mount the arm members 48 and 50 to the channels 37 and 38. Each arm member 48 and 50 further includes a second pair of openings 54 and 55 disposed opposite the openings 52, 53 and oriented ninety (90) degrees with respect to the openings 52 and 53. Each pair of openings 54 and 55 receives and retains a pin 56 and 57, respectively, therein such that each pin 56 and 57 is oriented perpendicularly to the pins 45 and 46 inserted through the pairs of openings 52 and 53.

Figure 2:
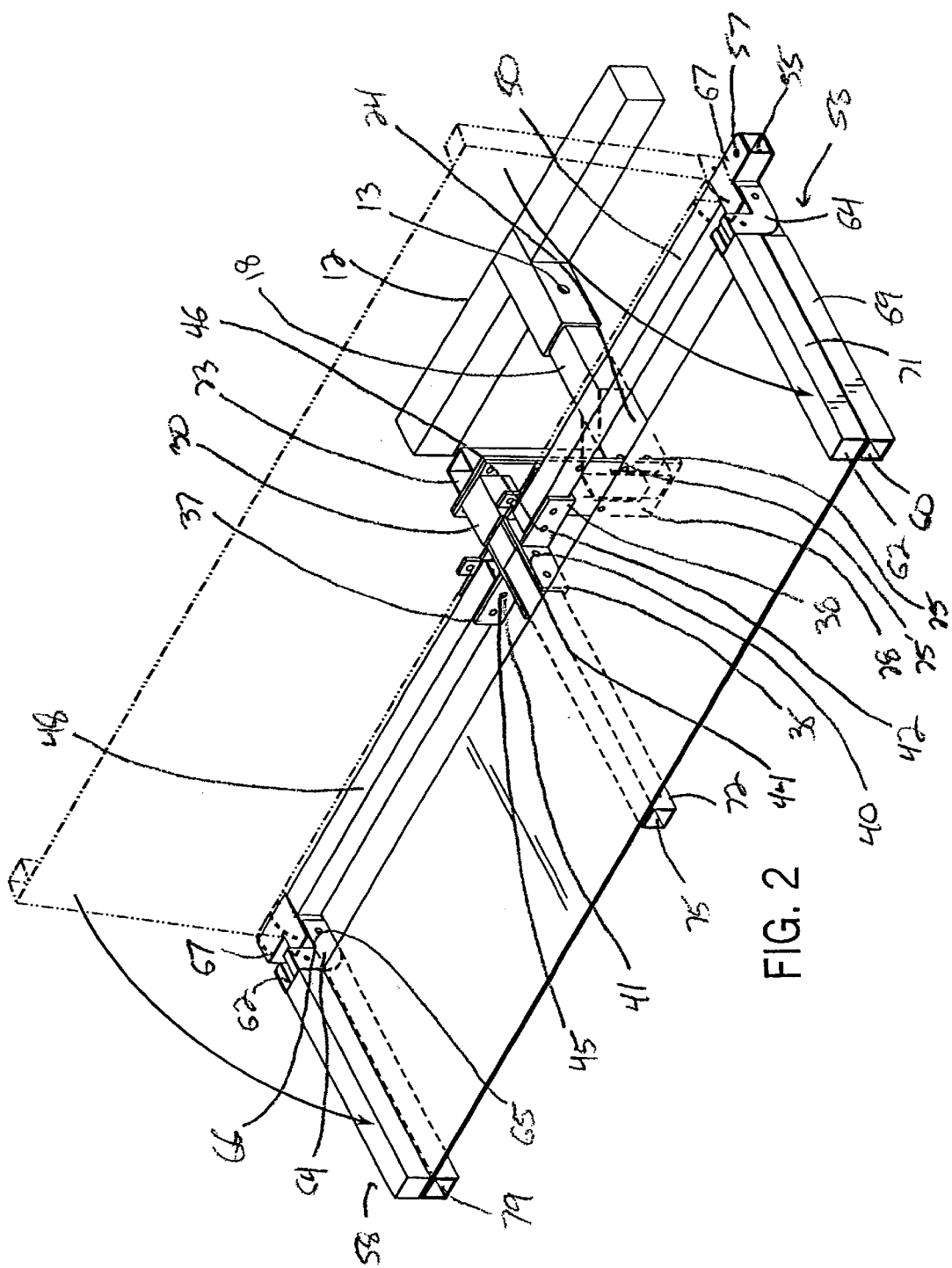
FIG. 2 is an isometric view of the seat assembly of FIG. 1 in a partially collapsed position.

The pins 56 and 57 in each arm member 48 and 50 are used to pivotally connect a support assembly 58 to each of the arm members 48 and 50 opposite the channels 37 and 38. Each support assembly 58 includes a horizontal member 60 that is pivotally secured to the arm members 48 and 50 by the pin 56 and 57, and a vertical member 62 pivotally secured to the horizontal member 60. The vertical member 62 is connected to the horizontal member 60 by a pair of generally L-shaped hinge plates 64. The hinge plates 64 are fixedly connected to the vertical member 62 at one end, and rotatably connected to a pin 65 extending through a pair of aligned openings 66 located in the horizontal member 60 at the opposite end. The hinge plates 64 are connected between the horizontal member 60 and the vertical member 62 such that when the vertical member 62 is pivoted towards the horizontal member 60, the vertical member 62 is capable of being positioned flush against the horizontal member 60, as best shown in FIG. 2.

The horizontal members 60 are pivotally connected to the pins 56 and 57 in the arm members 48 and 50 by a similarly shaped pair of L-shaped hinge plates 67. The plates 67 are fixedly connected to each of the horizontal members 60 on opposite sides of the horizontal member 60 between the hinge plates 64, and rotatably connected opposite the horizontal member 60 to each end of the pins 56 and 57, respectively. The configuration of the hinge plates 67 enables each horizontal member 60 to rotate with respect to the arm members 48 and 50 from a position where the horizontal member 60 is oriented perpendicular to the arm members 48 and 50, best shown in FIGS. 1–3, to a position where the horizontal member 60 is positioned flush against and parallel to the arm members 48 and 50, best shown in FIG. 4.

In order to provide the ability for an individual to sit on the seat assembly 14, the assembly 14 also includes a pair of removable support surfaces 68 and 70 having pairs of sleeves 69 and 71, respectively, disposed at each end of the surfaces 68 and 70. The support surface 68 is connected between the horizontal members 60 of each support assembly 58 by removably placing the sleeves 69 around each of the members 60 in order to provide a seat support surface for the assembly 14. Further, the support surface 70 is connected between the vertical member 62 of each support assembly 58 by removably placing the sleeves 71 around each of the members 62 in order to provide a back support surface for the assembly 14. Each support surface 68 and 70 is formed of a generally flexible material such that the support surfaces 68 and 70 can deform when contacted by an individual sitting and/or reclining against the support surfaces 68 and 70. The support surfaces 68 and 70 can be formed of any suitable material, with a fabric material being preferred, and a synthetic fabric material, such as nylon, being especially preferred. Also, the support surfaces 68 and 70 can alternatively include securing means other than the sleeves 69 and 71 for releasably attaching the support surfaces 68 and 70 to the horizontal members 60 and vertical members 62, respectively. The alternative securing means can include a bar (not shown) disposed on each end of the surfaces 68 and 70 that is slidably received in a channel (not shown) located on each member 60 and 62, or a number of snaps (not shown) located on each surfaces 68 and 70 that are engageable with complementary bases (not shown) found on the members 60 and 62.

The flexible material used to form the seat support surface 68 and back support surface 70 may also be modified to include additional components to increase the utility of the seat assembly 14. For example, seat support surfaces 68 and 70 can be formed of multiple layers of fabric in order to form an open interior (not shown) in which can be disposed a heating pad or electric blanket (not shown) which can be operably connected to the electrical system of the vehicle in order to provide heat to individuals sitting on the seat assembly 14 when the assembly 14 is utilized in cold weather conditions.

To provide additional support for the seat support surface 68, the assembly 14 also includes a support member extension 72. The extension 72 is pivotally secured within the channel 36 by the pin 44 which is inserted through the openings 40 in the channel 36 and through a pair of aligned openings 74 located adjacent one end of the extension 72. When supporting the seat support surface 68, the extension 72 is pivoted to extend outwardly from the channel 36 parallel to the frame support portion 30 and the horizontal members 60 as best shown in FIG. 1.

Figure 6:
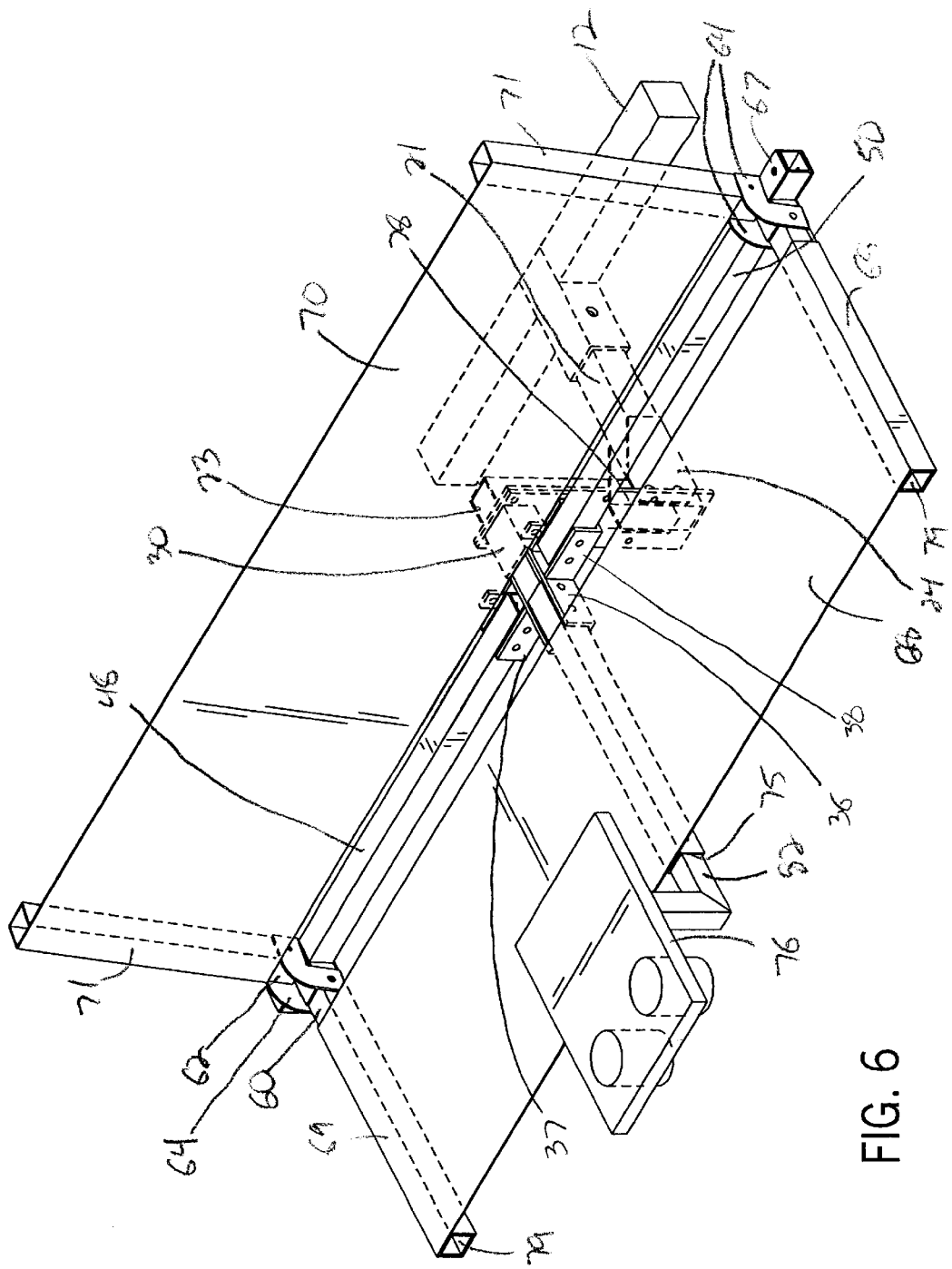
FIG. 6 is an isometric view of the seat assembly of FIG. 1 in the use position and including a table attachment.
Figure 7:
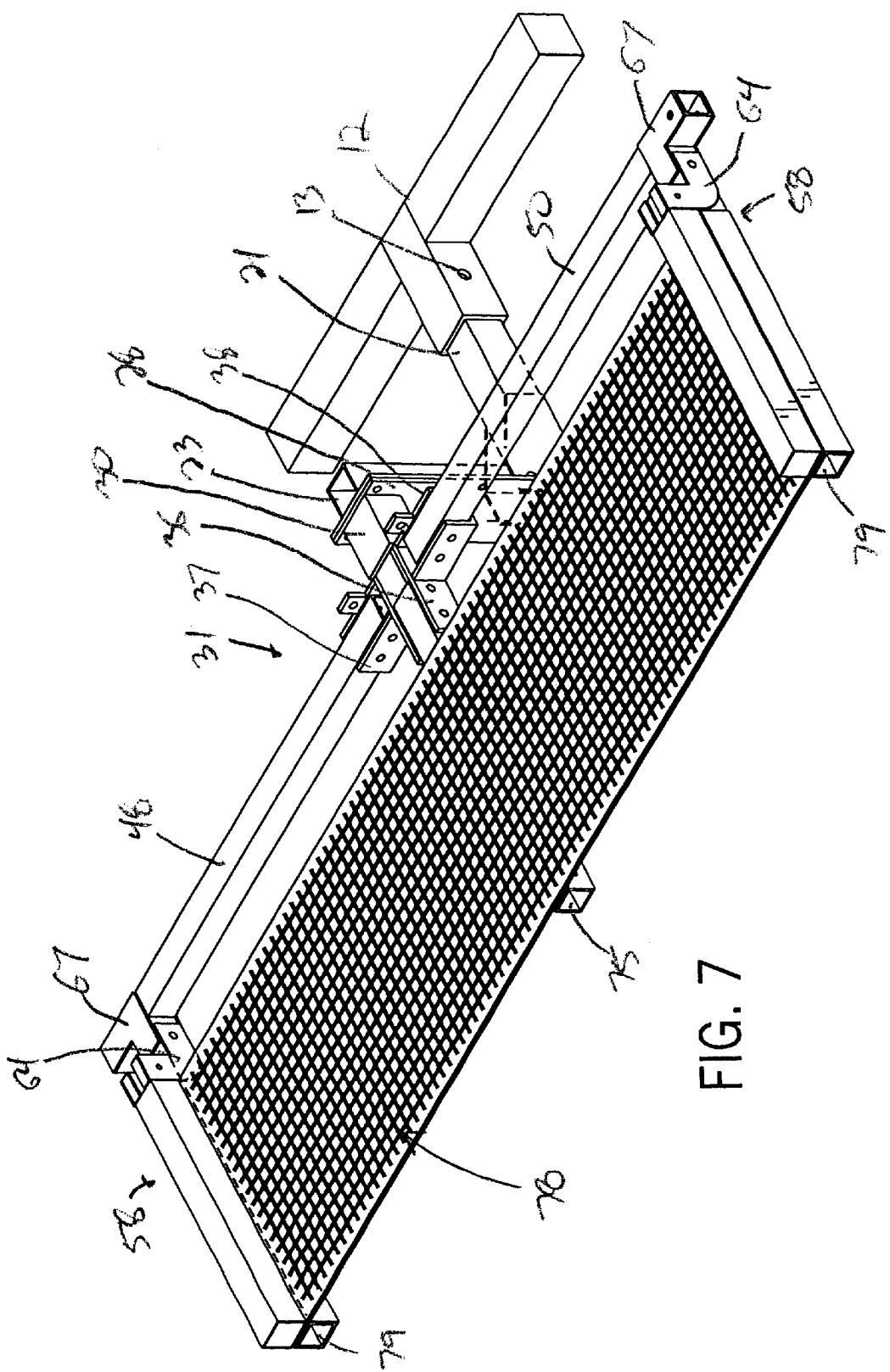
FIG. 7 is an isometric view of the seat assembly of FIG. 1 in the partially collapsed position and incorporating a cargo carrier attachment.

The extension 72 is formed to be a generally hollow, tubular member and includes an opening 75 located opposite the channel 36 into which an attachment can be secured to enhance the utility of the assembly 14. One example of an attachment that can be secured to the extension 72 is a table 76 having a stem 82 that is insertable into the opening 75 in the extension 72 opposite the channel 36 as shown in FIG. 6. The stem 82 supports a tabletop 84 opposite the extension 72 on which various items such as plates and cups utilized by individuals sitting on the assembly 14 can be placed. When the assembly 14 is in the use position, the table 76 can also be secured to either or both of the horizontal members 60 which are also preferably formed as generally hollow, tubular members with an opening 79 (not shown) opposite the arms 48 and 50 similar to the opening 75. Furthermore, as best shown in FIG. 7, in a partially extended position the assembly 14 can also be utilized with a rigid cargo platform 78 that is positioned between the vertical members 62 on the support surface 70. The platform 78 is a generally rectangular member which may be formed of a number of interconnected bars 85 that form a rigid base capable of supporting a number of heavy items. Thus, various items such as coolers, boxes, suitcases and other items may be positioned on the platform 78 and secured thereto by any conventional means in order to enable the assembly 14 to additionally function as a cargo carrier.

In the above-described preferred embodiment, the various structural components of the assembly 14, such as the support member 16, the arms 48 and 50, the support assemblies 58 and the hinge plates 64 and 66 are formed of a rigid material, such as a metal or hard plastic, with a metal such as aluminum, iron or steel being especially preferred.

Further, in addition to the horizontal members 60 and extension 72, the support member 16, the frame support portion 30, the arms 48 and 50, and the vertical members 62 are preferably formed as tubular members of the selected rigid material, with tubes having a square cross-section being especially preferred for each of the parts of the assembly 14. The use of a metal as the rigid material further enables the components of the assembly 14 that are fixed to one another to be welded together, but other means such as mechanical fasteners or adhesives can also be used.

Having described the structure of the seat assembly 14, the operation of the assembly 14 will now be described. In order to convert the seat assembly 14 from the use position shown in FIG. 1 to the storage position shown in FIG. 4, initially any attachment, such as the table 76, is disengaged from the assembly 14. After the attachment is removed, the vertical members 62 and back support surface 70 are pivoted about the pins 66 disposed in the horizontal members 60 to position the vertical members 62 flush against the horizontal members 60, as shown in FIG. 2. In this position, the support surface 70 is positioned against the support surface 68, essentially forming a single support surface that is easier to manipulate when collapsing the seat assembly 14. Further, as discussed previously, in this position the cargo platform 78 can be attached to or removed from the assembly 14 as desired.

Figure 3:
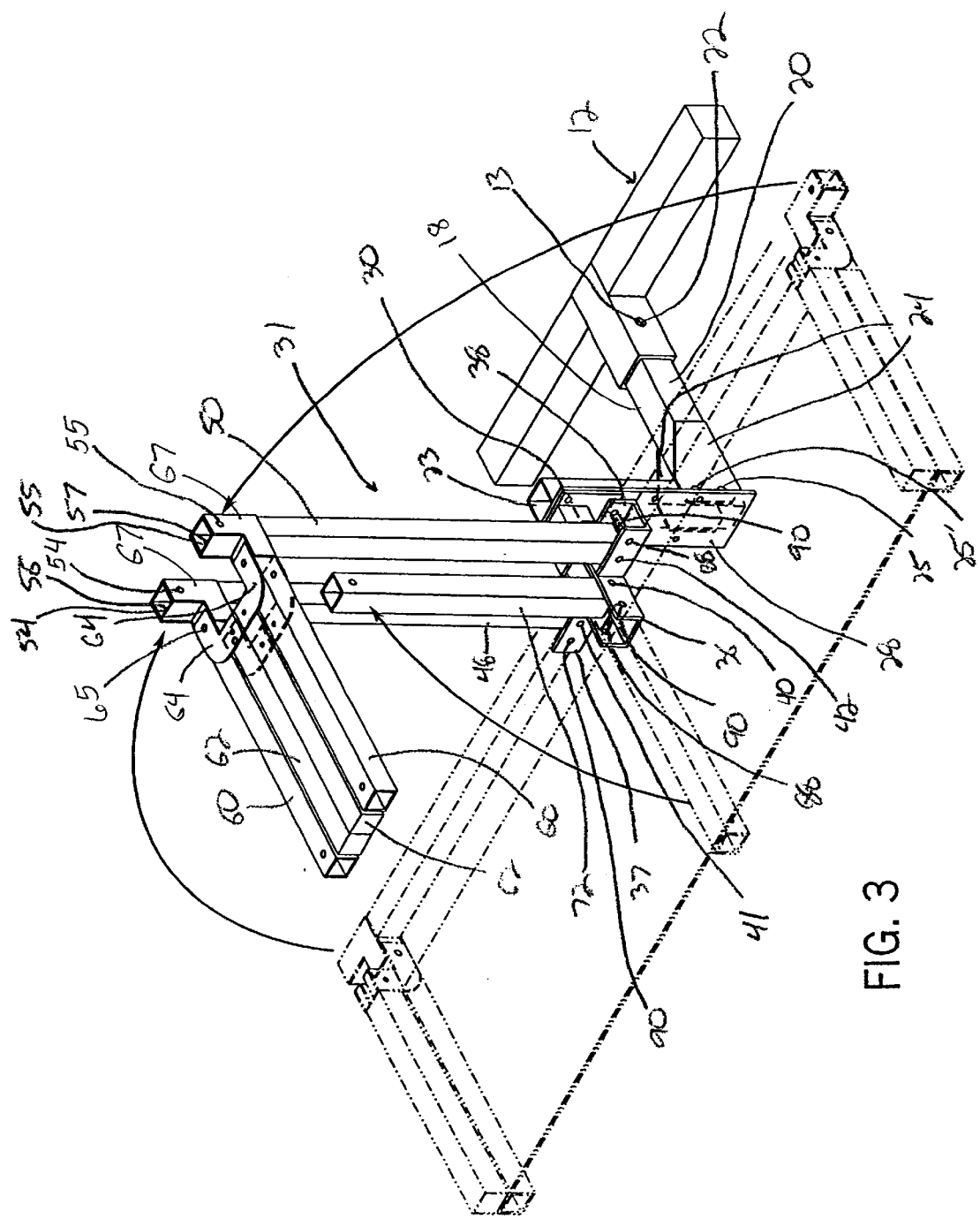
FIG. 3 is an isometric view of the seat assembly of FIG. 1 in a further partially collapsed position.

From this position, each of the arm members 48 and 50 are pivoted upwardly towards one another into the configuration shown in FIG. 3. The support surfaces 68 and 70 can be left on the assemblies 58 in this position, or can be removed as is shown in FIG. 3. Also, the support member extension 72 is pivoted upwardly with respect to the channel 36 to position the extension 72 parallel to the arm members 48 and 50. In this position, other attachments (not shown) can be fixed to or around the horizontal members 60 and vertical members 62 of the support assemblies 58 to enable the assembly 14 to function as a carrier for other items that can be suspended from the assembly 14, such as bicycles.

After moving the assembly 14 to the position of FIG. 3, the arm members 48 and 50 and extension 72 can each be fixed in the upright position by a locking pin 88. The pins 88 are inserted through pairs of locking openings 90 disposed on each channel 36, 37 and 38 and spaced from the pairs of openings 40, 41 and 42 to prevent the extension 72 and arm members 48 and 50 from pivoting back to the use positions shown in FIG. 1.

Figure 4:
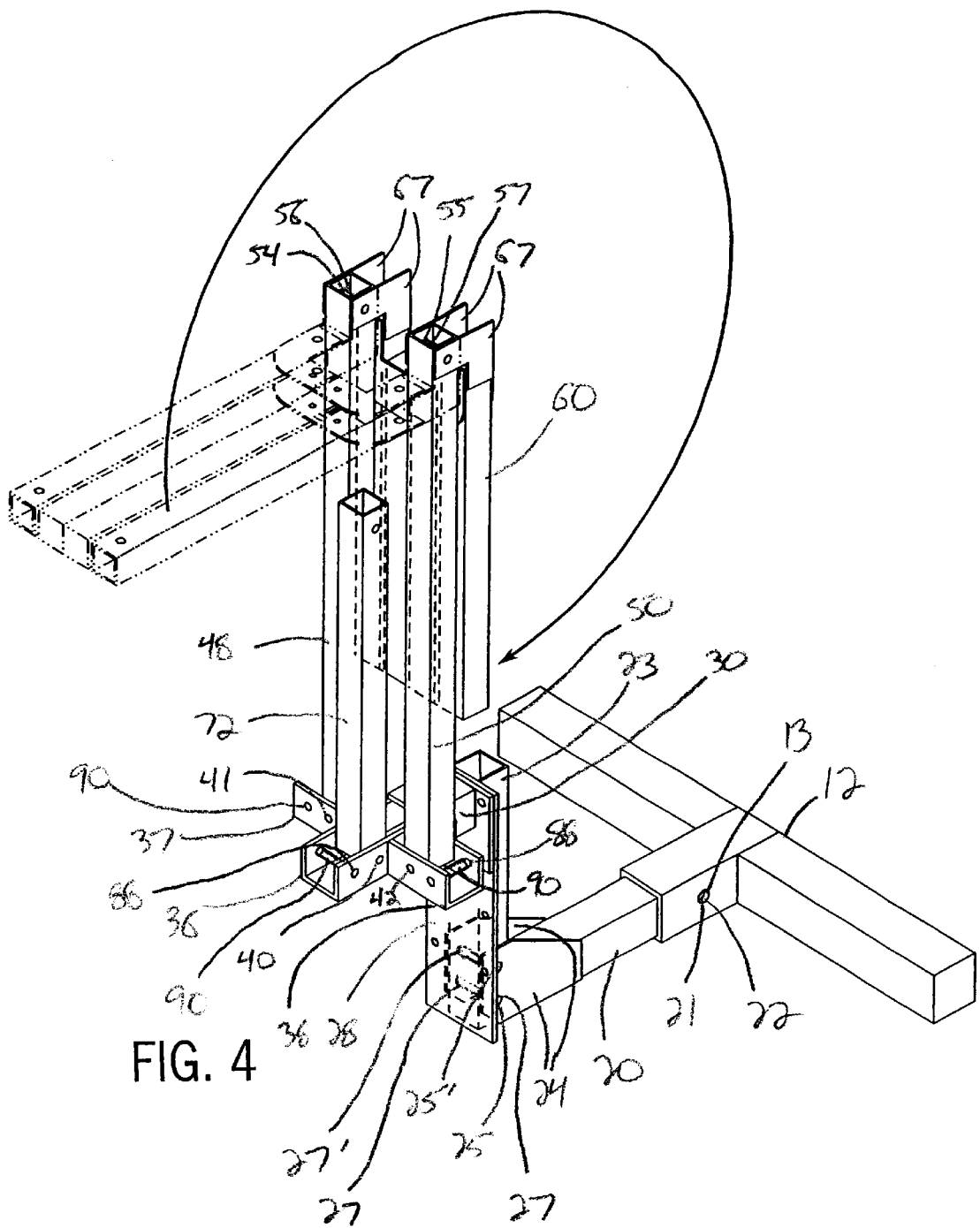
FIG. 4 is an isometric view of the seat assembly of FIG. 1 in a fully collapsed or storage position.
Figure 8:
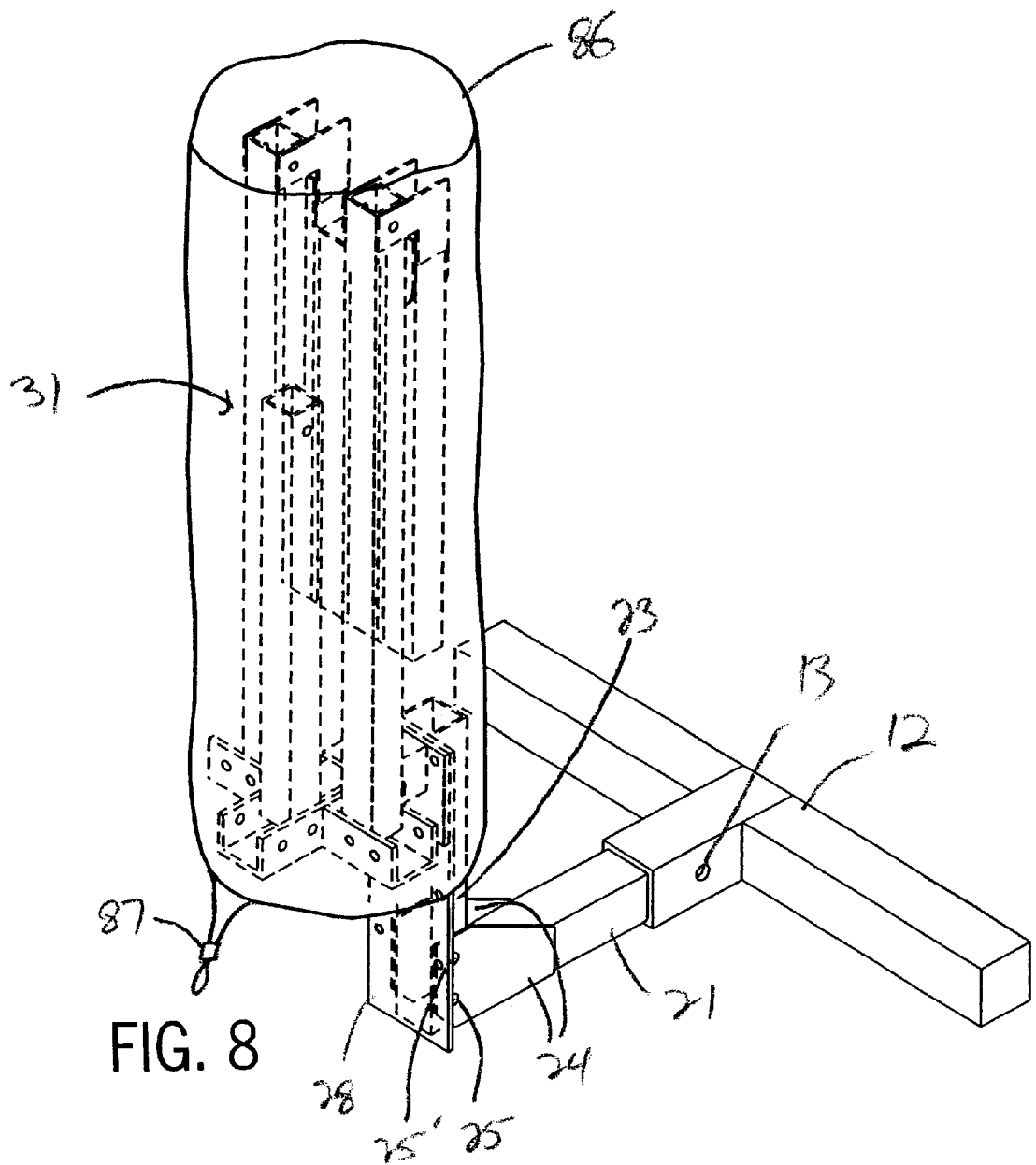
FIG. 8 is an isometric view of the seat assembly of FIG. 1 in the storage position and including a cover positioned over the seat assembly.

From this position, each of the horizontal members 60 is pivoted about the pins 56 and the respective arm members 48 and 50 to move the horizontal members 60 and vertical members 62 from the position in FIG. 3 where the members 60 extend perpendicularly from one side of the arms 48 and 50 to the position of FIG. 4 where the members 60 are located flush against and parallel to the opposite side of the arm members 48 and 50. Once the support assemblies 58 are moved to this position, as best shown in FIG. 8, a cover 86, such as a bag, formed of a material similar to the material used to form the support surfaces 68 and 70, can be positioned over and around the seat assembly 14 and secured thereto in order to prevent any portions of the seat assembly 14 from moving back into the deployed or use position. The cover 86 is open at one end to enable the assembly 14 to be inserted into and enclosed within the cover 86. The cover 86 also includes a securing mechanism 87, such as a drawstring closure 89, to secure the cover 86 around the assembly 14 in the storage position. However, any other suitable securing member can be used, such as rope, straps, bungee cords or rigid covers, among others.

Figure 5:
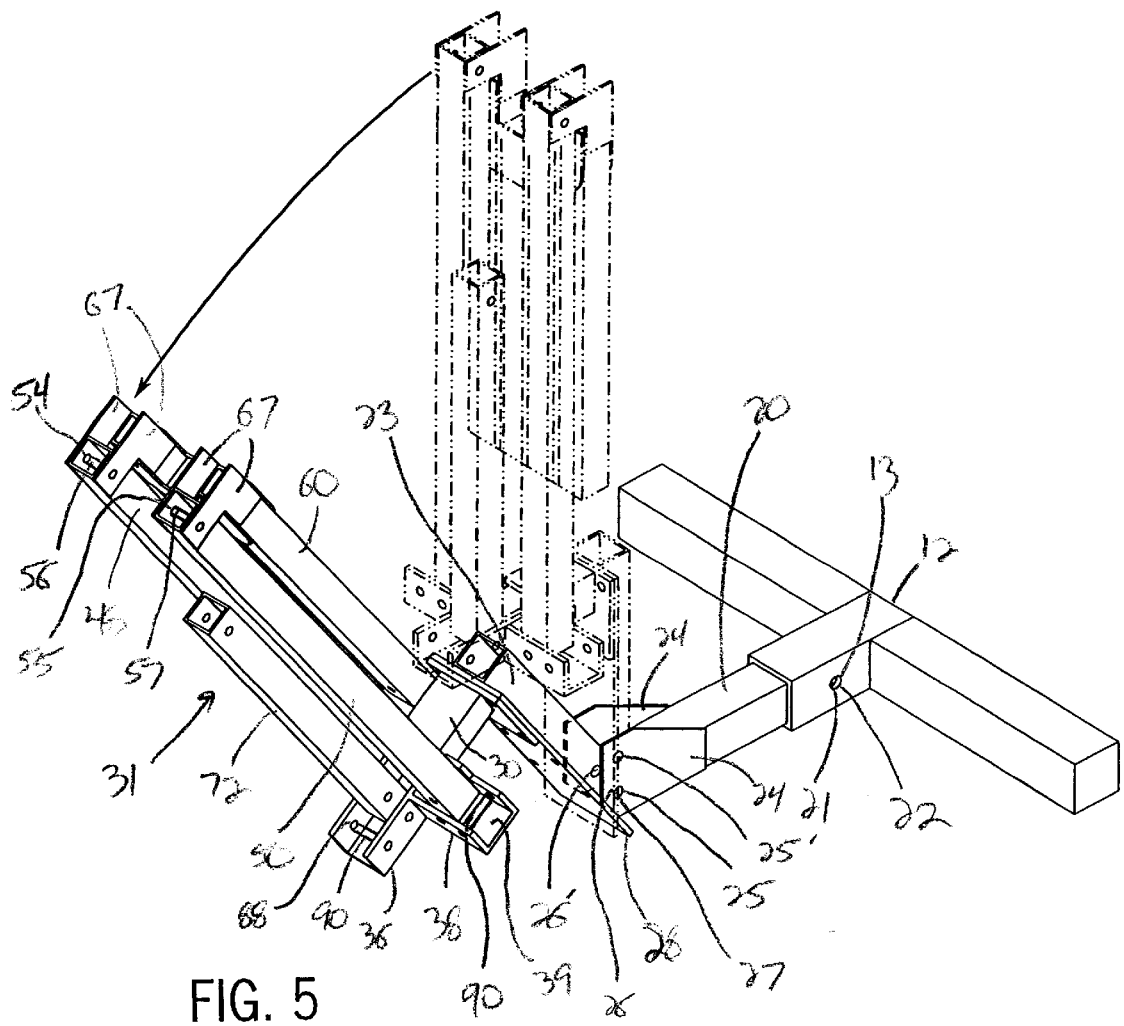
FIG. 5 is an isometric view of the seat assembly of FIG. 1 in the storage position and pivoted to allow access to the interior of the vehicle.

Once the seating frame 31 has been fixed in the storage position of FIG. 4, either with or without the cover 86, the frame 31 can be pivoted with respect to the hitch receiver 12 and the vehicle as shown in FIG. 5 to enable the vehicle to be accessed or opened without interference from the frame 31. To do so, the pin 27' is removed from within the openings 26' in the second end 23 and openings 25 in the brackets 24. The second end 23 can then pivot with regard to the first end 20 to move the frame 31 away from the vehicle.

In the alternative embodiment shown in FIG. 9, the frame 31 can also be moved relative to the vehicle once the arms 48 and 50, and extension 72 are secured in the storage position. To do so, the pin 27" is removed from within either pair of openings 32 and 33 in the frame support portion 30 and the openings 13 in securing sleeve 29. The frame 31 and the frame support portion 30 can then be slid inwardly or outwardly along the securing sleeve 29 until the pair of openings 13 in the sleeve 29 are aligned with one of the pairs of openings 32 or 33 on the support portion 30. The pin 27" can be reinserted through the openings 32 or 33 and 13 to secure the frame support portion 30 in the retracted or extended position within the securing sleeve 29 to allow easy access to the vehicle.

While the above description covers the preferred embodiment of the invention, other alternative embodiments are also considered to be covered as well. For example, the seating frame 31 may be formed with only a single arm member 48 and support assembly 58 secured to the support member 30. In this embodiment the assembly 14 provides a seating surface on only one side of the support member 30, forming a horizontal seating surface 68 between the extension 72 and the support assembly 58 and a vertical seating surface 70 between a vertical member (not shown) pivotally secured to the support member 30 and the support assembly 58. Also, the support assemblies 58 can omit the vertical members 62 to form only a horizontal seating surface 68 in the extended position.

Various alternatives are contemplated as being within the scope of the following claims particularly pointing out and distinctly claiming the subject matter regarded as the invention.

We hereby claim:

1. A seating assembly adapted for mounting to a hitch receiver disposed on a vehicle, comprising:
   a) a support member adapted to be secured to the hitch receiver; and
   b) a seat arrangement carried by the support member, wherein the seat arrangement includes a collapsible frame adapted for movement between an extended use position and a collapsed storage position and wherein the seat arrangement comprises:
   c) a pair of arms pivotally secured to opposite sides of the support member; and
   d) a pair of support assemblies pivotally secured to the pair of arms opposite the support member.

2. The assembly of claim 1 wherein the pair of support assemblies each comprises:
   a) a first member pivotally attached to one of the pair of arms; and
   b) a second member pivotally attached to the first member.

3. The assembly of claim 2 wherein each of the pair of support assemblies further comprises a first hinge fixedly secured to the first member at one end and pivotally secured to one of the pair of arms at the opposite end.

4. The assembly of claim 3 wherein each of the pair of support assemblies further comprises a second hinge fixedly secured to the second member at one end and pivotally secured to the first member at the opposite end.

5. The assembly of claim 2 further comprising a first support surface extending between the pair of support assemblies.

6. The assembly of claim 5 further comprising a second support surface extending between the pair of support assemblies and spaced from the first support surface.

7. The assembly of claim 6 wherein the first support surface extends between the first members and the second support surface extends between the second members.

8. The assembly of claim 5 wherein the first support surface is formed of a flexible material.

9. The assembly of claim 8 wherein the first support surface is formed of a fabric.

10. The assembly of claim 9 wherein the first support surface is formed of nylon.

11. The assembly of claim 1 further comprising a support member extension pivotally secured to the support member between the pair of arms opposite the hitch receiver.

12. The assembly of claim 1 wherein the pair of arms and the pair of support assemblies are pivotable between a storage position and a use position.

13. The assembly of claim 12 further comprising a cover releasably positionable over the pair of arms and the pair of support assemblies in the storage position.

14. The assembly of claim 1 further comprising an attachment releasably secured to the seating assembly.

15. The assembly of claim 14 wherein the attachment is a table.

16. The assembly of claim 14 wherein the attachment is a cargo platform.

17. The assembly of claim 14 wherein the attachment is secured to a support member extension secured to the support member opposite the hitch receiver.

18. A method for deploying a seating assembly on an exterior of a vehicle, the method comprising the steps of:
   a) providing a vehicle having a hitch receiver disposed on one end of the vehicle;
   b) providing a seat assembly having a support member, a pair of arms pivotally secured to opposite sides of the support member, and a pair of support assemblies pivotally attached to the pair of arms opposite the support member;
   c) engaging the support member with the hitch receiver;
   d) pivoting the pair of arms with respect to the support member; and
   e) pivoting the pair of support assemblies with respect to the pair of arms.

19. The method of claim 18 further comprising the step of securing an attachment to the seat assembly after pivoting the pair of support assemblies.

20. The method of claim 18 further comprising the step of attaching a first support surface between the pair of support assemblies after pivoting the pair of support assemblies.

21. The method of claim 20 further comprising the step of attaching a second support surface between the pair of support assemblies after attaching the first support surface.

22. The method of claim 18 wherein the pair of support assemblies each include a first member pivotally attached to one of the pair of arms and a second member pivotally secured to the first member, and wherein the step of pivoting the pair of support assemblies comprises the steps of:
   a) pivoting the first members with respect to the pair of arms; and
   b) pivoting the second members with respect to the first members.

23. The method of claim 18 wherein the seat assembly includes a support member extension pivotally secured to the support member and further comprising the step of pivoting the support member extension with respect to the support member prior to pivoting the pair of arms.

24. The method of claim 18 further comprising the step of moving the seat assembly to a storage position after pivoting the support assemblies.

25. The method of claim 24 further comprising the step of placing a cover over the seat assembly in the storage position after moving the seat assembly to the storage position.

26. A seat assembly comprising:
   a) a first member adapted to be releasably secured to a vehicle hitch receiver;
   b) a second member pivotally secured to the first member to move generally perpendicularly with respect to the first member;
   c) a third member pivotally secured to the second member opposite the first member to move generally perpendicularly with respect to the second member; and
   d) a fourth member pivotally secured to the first member to move generally perpendicularly with respect to the first member and the second member.

27. The assembly of claim 26 further comprising a support surface secured between the third member and the fourth member.

* * * * *